United States Patent [19]

Glaser

[11] Patent Number: 4,740,122
[45] Date of Patent: Apr. 26, 1988

[54] RAPID-RELEASE CHUCK

[75] Inventor: Franz Glaser, Nuremberg, Fed. Rep. of Germany

[73] Assignee: Hertel Aktiengesellschaft Werkzeuge & Hartstoffe, Fürth, Fed. Rep. of Germany

[21] Appl. No.: 937,036

[22] Filed: Nov. 25, 1986

[30] Foreign Application Priority Data

Nov. 26, 1985 [DE] Fed. Rep. of Germany ... 8533253[U]

[51] Int. Cl.$^4$ .......................... B23C 5/26; B23B 31/00
[52] U.S. Cl. ............................ 409/232; 279/2 R; 408/240; 403/316; 403/324; 403/325
[58] Field of Search ............... 408/240, 239 R, 239 A; 279/2 R, 74, 75, 76, 77, 79, 80, 46 R; 409/232, 234, 230, 231; 403/322, 325, 328, 316, 324, 326

[56] References Cited

U.S. PATENT DOCUMENTS

| | | |
|---|---|---|
| 2,162,359 | 6/1939 | Rhinevault .......................... 403/328 |
| 2,408,503 | 10/1946 | Young .......................... 279/2 |
| 2,499,781 | 3/1950 | Rothenberger .......................... 279/2 |
| 2,987,334 | 6/1961 | Wendling .......................... 279/79 |
| 3,073,192 | 1/1963 | Beers .......................... 403/328 |
| 3,301,108 | 1/1967 | Heiner .......................... 279/2 |
| 3,469,871 | 9/1969 | Betts .......................... 403/325 |
| 4,322,190 | 3/1982 | Anderson .......................... 409/234 |
| 4,350,463 | 9/1982 | Friedline .......................... 279/2 R |

FOREIGN PATENT DOCUMENTS

3108439 11/1982 Fed. Rep. of Germany.

Primary Examiner—Eugene F. Desmond
Assistant Examiner—Daniel W. Howell
Attorney, Agent, or Firm—Spencer & Frank

[57] ABSTRACT

In a rapid release chucking device, particularly for drills, including a machine spindle (1) and a tool head (2) attached thereto in a manner secure against rotation, wedge faces (9) are provided at the circumference of a spreadable ring element (14). In the unspread state, this ring element lies withdrawn in an annular groove (15) surrounding the spindle end (3). A control slide (16) is mounted in the spindle (1) so as to be axially displaceable by an externally initiated displacement movement. A plurality of spreading elements (18) lie in openings (17) which radially penetrate the spindle end (3) and open into the annular groove (15). Axial displacement of control slide (16) causes the openings to be urged radially outwardly toward the inner ring wall (19) of the ring element (14). At the same time, the inner wedge faces (9) of the ring element are urged against a corresponding, conical inner ring flank (24), into position where the wedge is tightened.

18 Claims, 2 Drawing Sheets

RAPID-RELEASE CHUCK

BACKGROUND OF THE INVENTION

The present invention relates to a rapid-release chuck with a tool secured thereto. The chuck includes a spindle which is adapted to be rotated about a spindle axis and which has a terminal length portion. The tool has a head sleeve inserted on the terminal length portion in a coaxial and torque-transmitting relationship therewith. The head sleeve has, on an inner wall thereof, outer wedge faces and the chuck has radially outwardly advanceable and radially inwardly retractable inner wedge faces arranged to cooperate with the outer wedge faces of the head sleeve for axially pulling together the tool and the spindle.

In the above-mentioned chuck, which is disclosed in German Pat. No. 3,108,439, the shank of the tool head is inserted into a toolholder sleeve receivable in the spindle of the machine tool. The shank of the tool head includes a connecting pin which is oriented in a radial plane with respect to the spindle axis and has frustoconical ends at both sides which do not project radially beyond the tool head shank. Opposite the two ends of the connecting pin, two radially screwable holding screws are disposed in the walls of the toolholder sleeve and are provided, in their radially inner region, with conical recesses which correspond with the frustoconical ends of the connecting pin. By turning the two holding screws inwardly, the frustoconical ends of the connecting pin and the conical recesses come to lie against one another and cause the tool head and the tool holder to be pressed against one another in the axial direction.

In the known chucking device there exists the necessity of having to actuate both diametrally opposed holding screws. Moreover, there is only a two-point contact between tool holder and tool head.

SUMMARY OF THE INVENTION

It is an object of the invention to provide an improved rapid-release chuck of the above-outlined type in which the tool tightening operation is simplified and rendered and easier and more efficient.

This object and others to become apparent as the specification progresses, are accomplished by the invention, according to which, briefly stated, the terminal length portion of the spindle has a circumferential groove and a radially spreadable ring element seated in the circumferential groove and having an inner ring wall and circumferentially distributed, radially outwardly oriented wedge faces. The ring element has an unspread state in which the wedge faces are in a withdrawn position in the circumferential groove. A plurality of circumferentially distributed, open ended, radial ports is provided in the terminal length portion; each port faces the inner ring wall; a plurality of spreading elements is received in a separate port and cooperates with the inner ring wall; a control slide axially displaceably arranged within the terminal length portion of the spindle having a plurality of circumferentially distributed camming faces each facing a separate port and each cooperating with a respective spreading element. The control slide has a first axial position in which the camming faces of the control slide allow the spreading elements to assume a radially inner position in which the spreading elements allow the ring element to be in the unspread state. The control slide has a second axial position in which the camming faces of the control slide force the spreading elements outwardly to assume a radially outer position in which the spreading elements radially expand the ring element into a spread state. In the spread state the wedging faces of the ring element project out of the circumferential groove of the terminal length portion and are adapted to engage complemental wedge faces provided on inside portions of the head sleeve of the tool when the latter is in an inserted state on the terminal length portion of the spindle. An actuator displaces the control slide from its first position into its second position.

The invention makes it possible to effect wedging between spindle and tool head by way of more than two wedge elements, particularly in a statically defined manner by means of three wedge elements which are distributed uniformly over the circumference and which are all moved into their wedging position with the movement of but a single control slide. The structural configuration of the control wedge permits very easy chucking of the tool head. The control wedge need merely be driven from one external side radially into its wedging position in which it remains substantially self-locking. The tool head sleeve (that is, the sleeve-like terminus of the tool shank) is merely penetrated by a radial passage bore for the introduction of the control wedge.

DESCRIPTION OF THE PREFERRED EMBODIMENT

Figure 1:
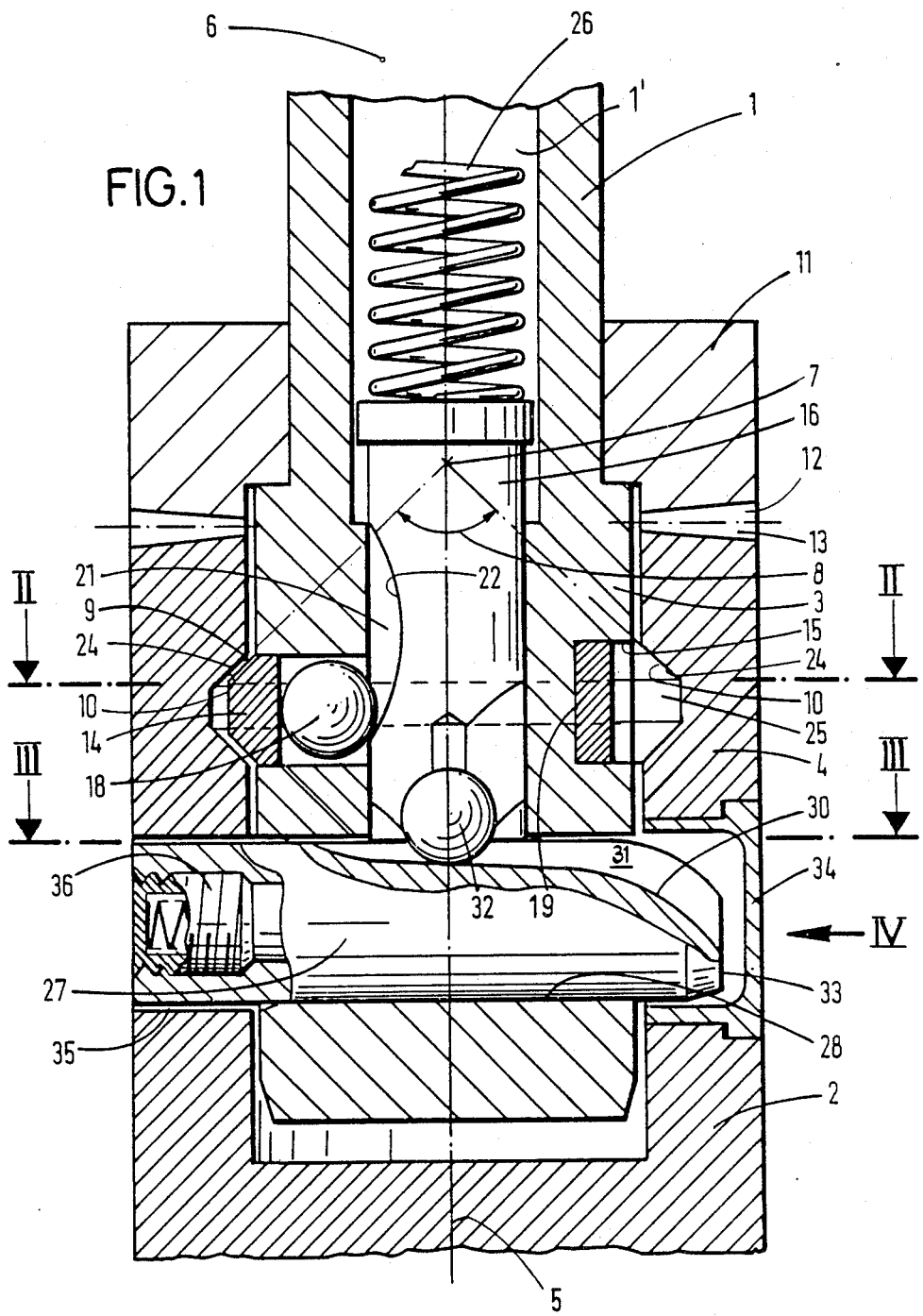
FIG. 1 is an axial sectional view of a preferred embodiment of the invention.

Turning to FIG. 1, the rapid release chucking device essentially comprises a machine spindle 1 and a tool head (shank) 2 which can be inserted axially onto the spindle end 3 so as to secure it against rotation. At spindle end 3 and at a tool head sleeve (shank sleeve) 4 surrounding the spindle end there are provided inner wedge faces 9 and outer wedge faces 10 which are disposed radially next to spindle axis 5 and form an acute angle which closes toward the machine side 6 and has its vertex 7 disposed approximately on spindle axis 5. Inner wedge faces 9 can be radially clamped together with outer wedge faces 10. They thus press tool head 2 and spindle end 3 against one another in the axial direction.

Spindle 1 is fixed to a flange 11 whose frontal face is provided with a serration 12. Serration 12 engages in a corresponding serration 13 at the upper front end of tool head sleeve 4 and thus establishes a connection between machine spindle 1 and tool head 2 which is secure against rotation.

Figure 2:
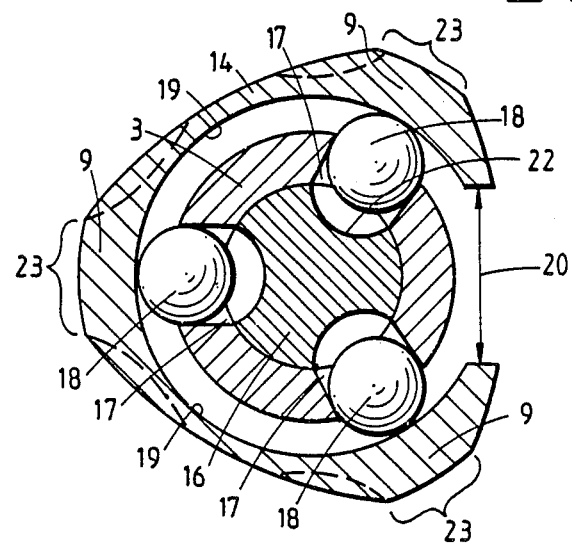
FIG. 2 is a sectional view along line II—II of FIG. 1.

Also referring to FIG. 2, the radially inner wedge faces 9 are disposed at the circumference of a spreadable ring element 14. In the unspread state, ring element 14 is withdrawn in an annular groove 15 which surrounds spindle end 3. A control slide 16 is mounted in a longitudinal channel (axial bore hole) 1' of the machine spindle 1 so as to be displaceable in the direction of spindle axis 5 by way of an externally initiated adjustment movement. Spindle end 3 is penetrated by three ports 17 which open radially into annular groove 15, with a ball 18 lying in each opening. Each ball 18 forms a spreading element which is urged radially outwardly against the inner ring wall 19 of ring element 14 by the axial displacement of control slide 16, thus widening ring element 14 as a result of a slit 20 provided therein. The use of balls as the force-transmitting elements between the control slide 16 and the ring element 14 enhances the ease of tightening operation of the chuck. For this purpose, a number of grooves 21 corresponding to the number of balls 18 to guide these balls 18 are disposed on the circumference of control slide 16. Grooves 21 extend in the axial clamping direction of control slide 16. The groove root 22 is rounded in the manner of a radial cam and continues steadily outwardly in the clamping direction of control slide 16. Slit 20 in ring element 14 is made wide enough for ring element 14 to be pushed into annular groove 15 over its groove root 22, utilizing the inherent resiliency of the ring element. In the unspread state, the inherent resiliency of ring element 14 causes it to spring back into its withdrawn position in annular groove 15. On the circumference of the ring element 14 there are provided, in uniform distribution, three circumferential sections 23 having inner wedge faces 9. The center circumferential section 23 lies diametrally opposite slit 20. The two outer circumferential sections 23 lie equidistantly adjacent slit 20. The cross-sectional thickness of ring element 14 in the region of the spaces between circumferential sections 23 and the inner wedge faces 9 is weakened to permit or, more precisely, facilitate the spring action of the ring element.

The outer wedge faces 10 associated with tool head sleeve 4 are formed by the conical flank 24 of an inner annular groove 25 made in the inner circumference of the head sleeve. Inner wedge faces 9, i.e. the wedge faces of ring element 14 associated with circumferential sections 23, form parts of a cone jacket which corresponds in its essential dimensions to the conical flank 24 of inner annular groove 25.

Figure 3:
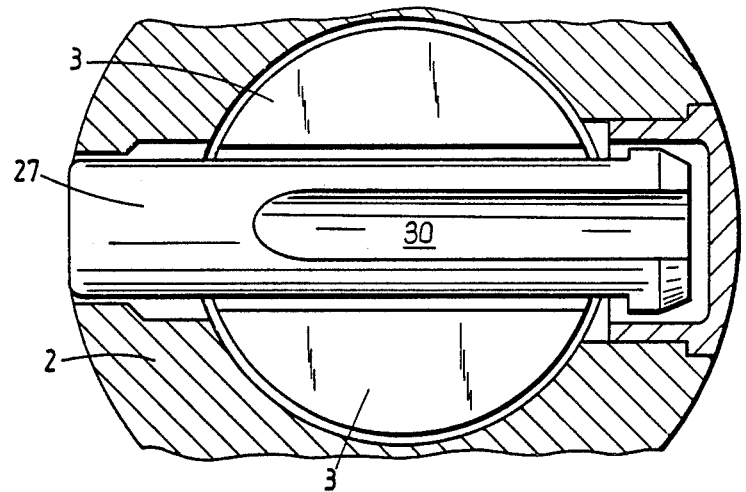
FIG. 3 is a sectional view along to line III—III of FIG. 1.
Figure 4:
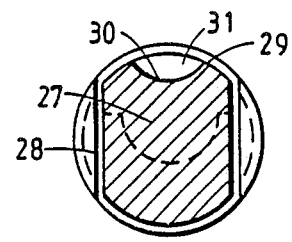
FIG. 4 is an end elevational view of a component seen in the direction of arrow IV of FIG. 1.

Also referring now to FIGS. 3 and 4, the control slide 16 is displaceable against the pressure of reset spring 26 by means of a control wedge (actuating wedge) 27 which is displaceable in the radial direction. Control wedge 27 is inserted into the radial bore 28 of spindle end 3 and penetrates tool head sleeve 4. At its flank 29 facing control slide 16, control wedge 27 has a control face 30 which is formed by the root of a guide groove 31 for a ball 32 embedded in the end of control slide 16. Radial bore 28 is a passage opening through which passes control wedge 27. Control wedge 27 is not in physical contact with tool head sleeve 4. Control face 30 has an S shape. In the tightening region (FIG. 1) opposite control slide 16, control face 30 is sloped toward the tip 33 of the control wedge, with the wedge angle being about 2° and thus self-locking. When the wedge is tightened, the tip 33 of control wedge 27 lies in a recess of tool head sleeve 4 which is closed to the outside by a cap 34.

To firmly connect tool head 2 with machine spindle 1, tool head sleeve 4 is pushed onto spindle end 3. This causes the serration 12, 13 on both parts to produce a connection between tool head 2 and machine spindle 1 which is secure against rotation. Reset spring 26 presses control slide 16 into a position in which the radially inwardly directed, resilient resetting force of ring element 14 presses balls 18 against the regions of their grooves 21 closest to spindle axis 5. Thus, the circumferential sections 23 of ring element 14 bearing the inner wedge faces 9 do not project radially beyond the circumference of spindle end 3, thus they do not impede the above-mentioned push-on movement. Serrations 12, 13 may, for example, be configured with one tooth missing so that tool head 2 can be pushed onto machine spindle 1 only in a specific rotary position. In this rotary position, the radial passage opening 35 in tool head 2 is flush with bore 28 so that control wedge 27 can be brought into its operative position radially against the direction of arrow IV. This causes ball 32 of control slide 16 to slide on control face 30 of control wedge 27 and push control slide 16 upwardly. During this movement, the steadily outwardly continuing roots 22 of grooves 21 in control slide 16 urge balls 18 radially outwardly. They act directly from the interior on the cirfumferential sections 23 and their inner wedge faces 9. As a result, the inner wedge faces 9 contact the outer wedge faces 10 and the conical flank 24 of inner annular groove 25 to thus urge tool head 2 into serrations 12, 13 and engagement with machine spindle 1. Contact with control slide 16 occurs in the self-locking region of control face 30. Control wedge 27 enters completely into passage opening 35 of tool head 2. To be able to remove control wedge 27, an extraction tool may engage into a threaded opening 36 at the head of control wedge 27 which is closed during normal operation.

If control wedge 27 is pulled out of passage opening 35 in the direction of arrow IV, reset spring 26 pushes control slide 16 downwardly. This resetting movement is supported by the radially inwardly directed inherent spring action of ring element 14. Circumferential regions 23 leave inner annular groove 25. Inner wedge faces 9 release outer wedge faces 10 and flank 24 of inner annular groove 25 with the result that tool head 2 can be removed from machine spindle 1.

It will be understood that the above description of the present invention is susceptible to various modifications, changes and adaptations, and the same are intended to be comprehended within the meaning and range of equivalents of the appended claims.

I claim:

1. In a rapid-release chuck for securing a tool thereto, including a spindle adapted to be rotated about a spindle axis; said spindle having a terminal length portion being adapted to receive a head sleeve of the tool in an inserted, coaxial and torque-transmitting relationship therewith; the improvement comprising
   (a) a circumferential groove provided in said terminal length portion;
   (b) a radially spreadable ring element seated in said circumferential groove and having an inner ring wall and circumferentially distributed, radially outwardly oriented wedge faces defining an acute angle with said spindle axis; said ring element having an unspread state in which said wedge faces are in a withdrawn position in said circumferential groove;
   (c) a longitudinal channel provided in said terminal length portion;
   (d) a plurality of circumferentially distributed, open ended, radial ports provided in said terminal length portion of said spindle; each said port being in communication with said longitudinal channel and facing said inner ring wall;
   (e) a plurality of spreading elements each received in a separate said port and cooperating with said inner ring wall;

(f) a control slide axially displaceably arranged in said channel and having a plurality of circumferentially distributed camming faces each facing a separate said port and each cooperating with a respective said spreading element; said control slide having a first axial position in which said camming faces of said control slide allow said spreading elements to assume a radially inner position in which said spreading elements allow said ring element to be in said unspread state; said control slide having a second axial position in which said camming faces of said control slide force said spreading elements outwardly to assume a radially outer position in which said spreading elements radially expand said ring element into a spread state; in said spread state the wedging faces of said ring element project out of said circumferential groove of said terminal length portion and are adapted to engage complemental wedge faces provided on inside portions of the head sleeve of said tool when said tool is in an inserted state on said terminal length portion of said spindle, whereby said head sleeve and said terminal length portion are axially pulled towards one another; and (g) actuating means for displacing said control slide from said first position into said second position thereof.

2. A rapid-release chuck as defined in claim 1, wherein said spreading elements are balls.

3. A rapid-release chuck as defined in claim 1, wherein said control slide has a plurality of circumferentially distributed grooves each having a root constituting a respective said camming face; each said root having a continuously changing radial distance from said spindle axis as viewed in a direction parallel to said spindle axis.

4. A rapid-release chuck as defined in claim 1, wherein said radially spreadable ring element has an inherent resiliency urging said spring element into said unspread state.

5. A rapid-release chuck as defined in claim 1, wherein said radially spreadable ring element has three radially outwardly projecting, circumferentially uniformly distributed ring portions each containing one of said wedge faces.

6. A rapid-release chuck as defined in claim 5, wherein said radially spreadable ring element has a discontinuity between two adjoining said ring portions and is of weakened construction between any other two adjoining said ring portions.

7. A rapid-release chuck as defined in claim 1, wherein each said wedge face is constituted by a surface portion of an imaginary cone.

8. A rapid-release chuck as defined in claim 1, wherein said actuating means comprises a control wedge arranged for displacement adjacent to and cooperating with said control slide for displacing said control slide from said first position into said second position.

9. A rapid-release chuck as defined in claim 8, wherein said terminal length portion of said spindle has a radial bore receiving said control wedge for radial sliding motions therein; said control wedge having a control camming face cooperating with said control slide.

10. A rapid-release chuck as defined in claim 9, wherein said radial bore has open ends and said control wedge is dimensioned to radially project beyond said radial bore.

11. A rapid-release chuck as defined in claim 9, wherein said control camming face of said control wedge has an end part oriented at an angle to said spindle axis such that a self-locking relationship between said control wedge and said control slide is effected when said control slide is in contact with said end part.

12. A rapid-release chuck as defined in claim 8, further comprising a follower ball embedded in an end of said control slide and arranged to ride on said control camming face of said control wedge.

13. A rapid-release chuck as defined in claim 12, wherein said control wedge has a guide groove having a length parallel to the direction of radial sliding motion of said control wedge in said radial bore; said guide groove having a root constituting said control camming face; said ball being received in said groove.

14. A rapid-release chuck as defined in claim 1, further comprising a return spring arranged to urge said control slide from said second position into said first position.

15. In a combination of a rapid-release chuck with a tool secured thereto, including a spindle adapted to be rotated about a spindle axis; said spindle having a terminal length portion; said tool having a head sleeve inserted on the terminal length portion in a coaxial and torque-transmitting relationship therewith; said head sleeve having, on an inner wall thereof, first wedge faces and said chuck having radially outwardly advanceable and radially inwardly retractable second wedge faces arranged to cooperate with said first wedge faces of said head sleeve of said tool; the improvement comprising (a) a circumferential groove provided in said terminal length portion;

(b) a radially spreadable ring element seated in said circumferential groove and having an inner ring wall and said second wedge faces being circumferentially distributed and radially outwardly oriented; said second wedge faces defining an acute angle with said spindle axis; said ring element having an unspread state in which said second wedge faces are in a withdrawn position in said circumferential groove;

(c) a longitudinal channel provided in said terminal length portion;

(d) a plurality of circumferentially distributed, open ended, radial ports provided in said terminal length portion of said spindle; each said port being in communication with said longitudinal channel and facing said inner ring wall;

(e) a plurality of spreading elements each received in a separate said port and cooperating with said inner ring wall;

(f) a control slide axially displaceably arranged in said channel and having a plurality of circumferentially distributed camming faces each facing a separate said port and each cooperating with a respective said spreading element; said control slide having a first axial position in which said camming faces of said control slide allow said spreading elements to assume a radially inner position in which said spreading elements allow said ring element to be in said unspread state; said control slide having a second axial position in which said camming faces of said control slide force said spreading elements outwardly to assume a radially outer position in which said spreading elements radially expand said ring element into a spread state; in said spread state said second wedge faces of said ring element project out of said circumferential groove of said terminal length portion and are in engagement with said first wedge faces for axially pulling said head sleeve and said terminal length portion towards one another; and (g) actuating means for displacing said control slide from said first position into said second position thereof.

16. A combination as defined in claim 15, further comprising an inner circumferential groove provided in said inner wall of said head sleeve; said circumferential groove having a generally conical flank constituting said first wedge faces.

17. A combination as defined in claim 15, wherein said actuating means comprises a control wedge arranged for displacement adjacent to and cooperating with said control slide for displacing said control slide from said first position into said second position; further wherein said terminal length portion of said spindle has a radial bore receiving said control wedge for radial sliding motions therein; said control wedge having a control camming face cooperating with said control slide; further wherein said radial bore has open ends and said control wedge is dimensioned to radially project beyond said radial bore; and further wherein said head sleeve having a radial bore in alignment with the radial bore in said terminal length portion of said spindle; said control wedge being surrounded by said radial bore in said head sleeve; said radial bore in said head sleeve being dimensioned such that said control wedge being out of contact with said head sleeve at least in said second position of said control slide.

18. A combination as defined in claim 17, wherein said head sleeve has an outwardly closed recess provided in said inner wall of said head sleeve in alignment with the radial bore therein; said control wedge having an end received in said recess in said second position of said control slide.

* * * * *